Jan. 27, 1942.    W. A. APPLETON    2,270,917
ELECTRICAL REMOTE CONTROL SYSTEM
Filed May 16, 1940

INVENTOR
WILLIAM A APPLETON
BY
ATTORNEY

Patented Jan. 27, 1942

2,270,917

UNITED STATES PATENT OFFICE 2,270,917

ELECTRICAL REMOTE CONTROL SYSTEM

William Arnold Appleton, Wembley, England, assignor to Radio Corporation of America, a corporation of Delaware Application May 16, 1940, Serial No. 335,534
In Great Britain February 8, 1939

8 Claims. (Cl. 250—40)

This invention relates to electrical remote control systems and has for its object to provide a simple automatically operating remote control system whereby an adjustable device, the adjustment of which varies the current or voltage in a circuit to a maximum or minimum and then past said maximum and minimum, may be adjusted to the maximum or minimum point, as the case may be.

According to this invention an electrical remote control system for securing automatic adjustment of a device which varies the voltage or current in a controlled circuit to a maximum or minimum and then past said maximum or minimum, comprises an electric motor, or the like, for adjusting said device, means for supplying electrical energy to said motor, or the like, and, in a control circuit for said motor, or the like, the contacts of a relay operated in dependence upon the absolute value of the current or voltage in said controlled circuit and the contacts of a further relay operated in dependence upon the rate of change of current or voltage in said controlled circuit, the whole arrangement being such that the motor, or the like, is automatically stopped when the rate of change of current or voltage becomes zero or changes in sign. The main application of the invention is to the remote control of tuned circuits in radio and other apparatus in which case the invention would be applied to the remote control of a tuning reactance, e. g. a variometer, which upon being varied changes the current or voltage in the tuned circuit to a maximum or minimum and then past said maximum or minimum.

The invention will be particularly described in connection with Figures 1 and 2 of the accompanying drawing.

Figure 1:
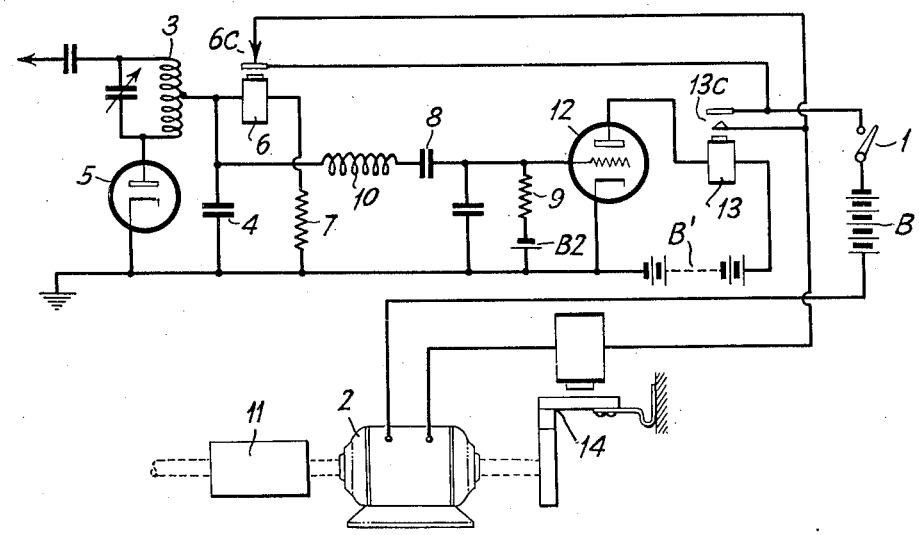

In Figure 1 the invention is shown as applied to an embodiment wherein it is required to effect remote control of a variable condenser, or other device, which is included in a radio transmitter and is operable to tune a circuit of said transmitter so as to obtain maximum output in the aerial thereof.

In this embodiment of the invention the device actually to be controlled, i. e. the variometer, variable condenser, or other device, is mechanically coupled, by way of a gear box 11, to an electric motor 2 which is energized from a source of potential B through a manually operable switch 1 and two sets of contacts 6c and 13c in parallel, said contacts being the contacts of relays 6 and 13. The motor may be adjacent the transmitter in the case in which the variometer or condenser is at the transmitter, or both motor and variometer or condenser may be remote from the transmitter. Coupled to the aerial of the transmitter is a pick-up coil (not shown) which is in series in a circuit with a tuned circuit 3, and a rectifier shown as a diode 5. The cathode of diode 5 is connected to one side of a condenser 4, while the other side of the condenser is tapped on the inductance of the tuned circuit 3. Connected across the condenser 4 is a circuit comprising a winding of a relay 6 in series with a first resistance 7. The relay winding is shunted by a further resistance. Connected across the resistance shunted relay and first resistance 7 is a second condenser 8 in series with a second resistance 9 and high frequency choke 10, said second resistance being connected across the grid/cathode space of a valve 12. The junction point of the second condenser 8 with the second resistance 9 is connected to the grid of the valve 12 whose cathode is connected to the other end of said second resistance 9 and to the cathode of the diode. The anode of the valve 12 is connected through the winding of the second relay 13 and a source B' of anode potential to the cathode of said valve. Grid bias is, as shown, applied to valve 12 by battery B2, and resistance 9 and source B2 are shunted by a condenser.

With this arrangement if the manually operable switch 1 is closed, the motor will run so long as either or both of the pairs of relay contacts are closed. The first relay 6 is arranged with its contacts 6C normally closed, in which condition it remains until a predetermined relatively small amount of current flows through its winding, this relatively small amount corresponding to the rectified output from the diode 5 when the pick-up from the pick-up coil is substantially less than that which is obtained when the transmitter is tuned to maximum output from the aerial. The second relay 13 is arranged with its contacts 13C normally open but retains them closed by virtue of the space current through the valve 12, i. e. by the current which flows through the valve 12 when the grid thereof is not negatively biased.

The operation is as follows:

On the manual switch 1 being closed, the motor 2 will run and accordingly the variometer or condenser will be adjusted by the motor and the current in the aerial will rise. As the current in the aerial rises the current through the diode rises and therefore the current through the winding of relay 6 also rises. When a predetermined value of current through the winding of relay 6 has been reached, this relay opens its contacts 6C, but the motor will continue to run because the space current flow through the valve is sufficient to energize relay 13 and thus to hold the contacts of this relay closed. So long as the current in the pick-up coil continues to rise this state of affairs persists and the motor continues running, but when the said current becomes steady or begins to fall, the grid of the valve has its potential displaced in the negative direction, the current through the valve 12 is reduced, or cut off altogether and relay 13 opens its contacts, with the result that the motor stops.

An electro-magnetic brake 14 may be arranged with its winding in the supply circuit for the motor, the brake being biased to brake the motor as soon as current is withdrawn therefrom.

Figure 2:
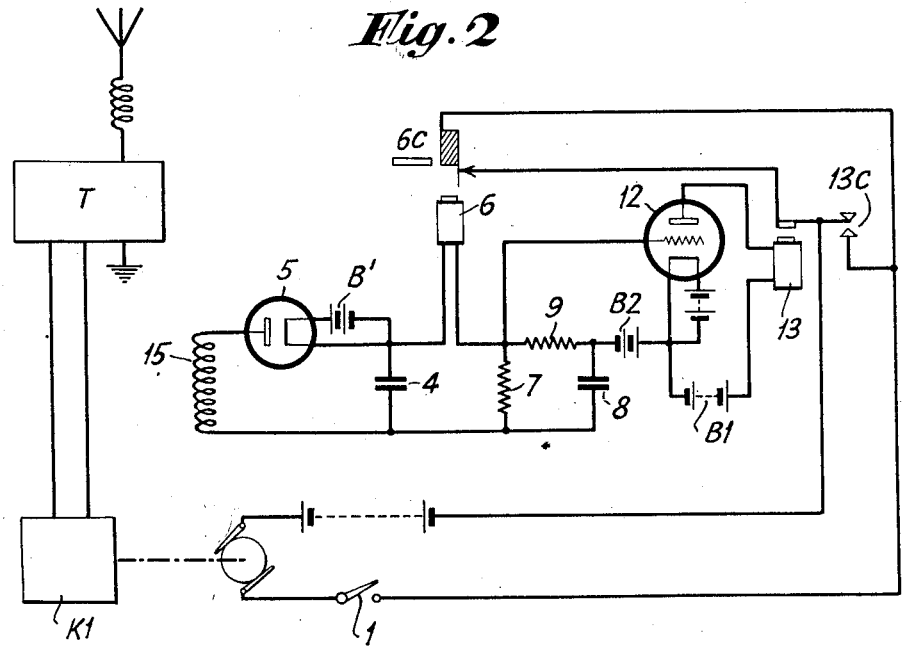

In a modification illustrated in Figure 2, and utilizable for the same purposes as the first described embodiment, the valve 12 has its grid directly connected to the junction point of the winding of the first relay 6 with the first resistance 7. The point is also connected through the further resistance 9 in series with a condenser 8 across the said first resistance 7 and the side of resistance 9 remote from the grid is connected to the cathode of the valve through a negative bias source B2. The anode circuit of the valve contains the winding of the second relay 13 in series with an anode potential source B1 as before. The aerial of transmitter T is tuned by the device K1 mechanically coupled to motor 2 and energy is picked up from the aerial circuit by pick-up coil 15 which as before is in series with diode 5, condenser 4 being also included in series. Relay 6 and resistance 7 are connected across condenser 4.

With this arrangement the normal negative bias on the grid of valve 12 is such that the steady anode current is insufficient to "pull in" the armature of the second relay 13. It will be seen that a rise in current through resistance 9 will cause a rise in positive potential on the grid of the valve and this causes the second relay to "pull in" its armature. As will be appreciated the arrangement is such that while the output from the transmitter is rising the armature of the second relay is "pulled in" and its contacts are closed but when the transmitter output becomes steady or begins to fall, the second relay opens its contacts, and the motor stops.

Although the invention has been particularly described as applied to the control of a radio transmitter, the remote control system of the said invention can be used to secure adjustment of varying direct current or low frequency currents as may be required.

I claim:

1. In an arrangement for automatically adjusting a tunable circuit to resonate at the frequency of signalling energy impressed thereon, a tuning instrumentality for tuning said circuit, an electric motor for operating said tuning instrumentality, means for supplying electrical energy to said motor, a control circuit for said motor, means for transferring a portion of the signalling energy in said tunable circuit to said control circuit, said control circuit including a first relay device operated in dependence upon the absolute value of the energy impressed upon said control circuit and a second relay device operated in dependence upon the rate of change of the energy impressed upon said control circuit, said second relay device acting upon operation to stop the operation of the motor.

2. The method of tuning a circuit to resonance at the frequency of signalling energy impressed upon the circuit which comprises rectifying a portion of the signalling energy impressed upon the circuit, deriving the derivative of said portion of the signalling energy automatically varying the tuning of the circuit in response to the sign of said derivative and stopping said tuning variation at substantially the point where the sign of said derivative changes.

3. In an electrical remote control system, a tunable circuit including a variable tuning instrumentality, a motor for operating said tuning instrumentality, a control circuit for said motor coupled to receive energy from said tunable circuit, a source of electrical energy for operating said motor, said motor control circuit including a first relay device adapted to be operated in dependence upon the absolute value of the energy transferred from said tunable circuit to the control cricuit and a second relay device operated in dependence upon the rate of change of the energy transferred from said tunable circuit to said control circuit, a pair of switching devices, a source of electrical energy for operating said motor, a manually operated switch and a switching device adapted to be operated by said second relay device connected in series with said source of electrical energy and said motor whereby said motor is energized upon closure of said last two named switching devices, and a switching device adapted to be operated by said first relay device, said last named switching device being connected in parallel with said second named switching device whereby the motor is adapted to be operated upon closure of said manually operated switch and said last named switching device irrespective of the condition of the first named switching device.

4. The arrangement described in the next preceding claim wherein said first relay device comprises a diode rectifier circuit the input of which is coupled to the tunable circuit and the output of which includes means for operating the third named switching device and wherein the second named relay device comprises an electronic tube having an input circuit, resistance coupled to the output circuit of the diode rectifier, and an output circuit which includes means for operating said second named switching device, said electronic tube being normally biased so that current through its output circuit is insufficient to close the second named switching device as long as the energy impressed upon the input of the diode rectifier is increasing.

5. In an electrical remote control system, a tunable circuit upon which signalling energy is impressed, an adjustable tuning instrumentality forming part of the tunable circuit, a motor for operating said tuning instrumentality, a diode rectifier having an input circuit coupled to said tunable circuit and an output circuit including a relay device provided with a switch adapted to be opened when the current through the diode rectifier is in excess of a predetermined amount, an electronic tube having an input circuit, resistance coupled to the output circuit of the rectifier and an output circuit including a relay device and an associated switch arranged so that the switch is opened when the current through said electronic tube falls below a predetermined value, a source of current for operating said motor and means including said two switching devices in parallel for connecting the source to said motor.

6. An arrangement for automatically maintaining a desired relationship between the resonant frequency of an antenna circuit and the frequency of signal energy supplied thereto comprising a motor for varying the tuning of said antenna circuit, a circuit for energizing said motor, said circuit including therein a normally closed switch and a normally open switch both connected in parallel and adapted to control operation of said motor, means responsive to the increase of signal current in said antenna circuit above a predetermined value for opening said normally closed switch, and means responsive to the differential quotient with respect to time of the current in said antenna circuit for maintaining said normally open switch closed.

7. An arrangement for automatically maintaining a desired relationship between the resonant frequency of an antenna circuit and the frequency of signal energy supplied thereto comprising means for varying the tuning of said circuit, said means including a normally closed switch and a normally open switch, both said switches being connected in parallel and adapted to control the operation of said tuning means, means responsive to the increase of signal current in said antenna circuit above a predetermined value for opening said normally closed switch, means responsive to the differential quotient with respect to time of the signal current in said antenna circuit for maintaining said normally open switch closed, and said last-mentioned responsive means stopping variation of said tuning means at the frequency of said signal energy.

8. An arrangement for automatically maintaining a desired relationship between the resonant frequency of an antenna circuit and the frequency of signal energy supplied thereto comprising means for varying the tuning of said antenna circuit, said means including a relay having normally closed contacts and a second relay having normally open contacts, said contacts being connected in parallel and adapted by their closure to cause operation of said tuning means, a rectifier coupled to said antenna circuit and coupled to said normally closed relay for energizing said relay in response to an increase of signal current in said antenna circuit above a predetermined value, a thermionic discharge tube including in its plate circuit said normally open relay, said thermionic discharge tube being so biased that in the absence of a control potential said normally open relay is not actuated, and means for applying to said thermionic discharge tube a control potential proportional to the differential quotient with respect to time of the signal current in said antenna circuit.

WILLIAM ARNOLD APPLETON.